United States Patent [19]

Akao

[11] Patent Number: 4,565,743
[45] Date of Patent: Jan. 21, 1986

[54] PACKAGE MATERIALS FOR BUNDLE-WRAPPING UNIT CASES

[75] Inventor: Mutsuo Akao, Minami-ashigara, Japan

[73] Assignee: Fuji Photo Film Co., Ltd., Minami-ashigara, Japan

[21] Appl. No.: 578,290

[22] Filed: Feb. 8, 1984

[30] Foreign Application Priority Data

Feb. 14, 1983 [JP] Japan .................................. 58-21614

[51] Int. Cl.$^4$ ........................................... B32B 27/30
[52] U.S. Cl. ..................................... 428/522; 428/35; 428/518; 428/913; 206/524.2; 229/3.5 R
[58] Field of Search ................. 428/35, 520, 522, 913, 428/518; 206/524.2; 229/3.5 R

[56] References Cited

U.S. PATENT DOCUMENTS

| | | | |
|---|---|---|---|
| 4,241,144 | 12/1980 | Hendy | 428/520 |
| 4,386,124 | 5/1983 | Arao | 428/520 |
| 4,403,464 | 9/1983 | Duncan | 428/35 |
| 4,442,158 | 4/1984 | Distler | 428/520 |

FOREIGN PATENT DOCUMENTS 0020355 2/1982 Japan .................................... 428/9.3

Primary Examiner—Edith Buffalow
Attorney, Agent, or Firm—Burns, Doane, Swecker & Mathis

[57] ABSTRACT

Moisture-proof polypropylene film package materials for packaging unit cases in lots, especially for photographic roll film small cases, comprising:
(a) a biaxially-stretched polypropylene film substrate having,
   (i) stretching of 2 to 15 times,
   (ii) the thermal contraction both in longitudinal and transverse directions of 2–8%, and
   (iii) the relative ratio of thermal contraction in both directions of 40% or less,
(b) polyvinylidene chloride resin coating applied onto at least one surface of the film substrate, and
(c) an antistatic agent incorporated in at least one of layers.

18 Claims, 2 Drawing Figures

PACKAGE MATERIALS FOR BUNDLE-WRAPPING UNIT CASES

FIELD OF THE INVENTION

The present invention relates to transparent synthetic resin films applicable to packaging unit cases, particularly to commercial photographic roll film cases, in bundles or lots.

BACKGROUND OF THE INVENTION

Commercial photo-film cases are in general packed with a transparent wrapping film, in lots of 10 or 20 unit cases or so, i.e., bundle-wrapped when freshly delivered from the factory.

Conventional package materials heretofore used are moisture-proof cellophanes having polyvinylidene chloride coatings on both surfaces thereof, and non-stretched low density polyethylenes. Those conventional materials have, however, various problems as mentioned below, and the improvements thereon have been desired. More specifically, moisture-proof cellophanes have the following defects:

(a) The contraction and expansion are great, depending upon the moisture. In a moist atmosphere of high humidity, therefore, the cellophanes absorb the moisture to elongate and curl, further resulting in the occurrence of blocking with packaged (wrapped) cases. In a dry atmosphere of low humidity, on the contrary, they will shrink and the sealed portions come to peel off or the wrapped cases are often depressed or crushed thereby.

(b) When exposed to ultraviolet rays or when dried and dehydrated, they become brittle and are often broken.

(c) The thermal contraction during the processing operation is poor, and therefore, mechanical tight wrapping is difficult and the package of unit cases bundle-wrapped in one lot will become loose and rickety.

(d) The impact strength is poor. In particular, the tear strength is poor in a less moist and dehydrated state, and they are often broken.

(e) The cost is high.

On the other hand, the non-stretched polyethylenes also have the following drawbacks:

(a) Heat-sealing is difficult. (This is because, when the temperature is elevated, other portions than the heat-sealed portions are melted.)

(b) The thermal contraction is poor and the wrapped package in lots will become rickety.

(c) The physical strength and rigidity are poor, and the film is required to be thick, which is disadvantageous with respect to the transparency and the cost thereof. Even if the film is made thick, the surface is apt to be scratched, and the film is likely to become opaque.

(d) The smoothness, gloss and moisture-proofness are poor.

With respect to the thermal contraction, among these problems, this is naturally improved and increased by using a stretched-film, which, however, results in occurrence of wrinkles during mechanical packaging operation, and this is of no practical use. Under the circumstances, various studies have been made on the use of low-stretched films in such degree that they do not wrinkle while processed. However, any simple technique has not heretofore been found, enough to satisfy the thermal contraction without occurrence of wrinkles.

SUMMARY OF THE DISCLOSURE

Therefore it is an object of the present invention to provide a novel package material which eliminates the drawbacks of the conventional package or wrapping materials for packaging unit cases in bundle.

Other objects will become apparent in the entire disclosure.

The inventors have further studied various package materials on the above mentioned points, and have at last found the fact that moisture-proof polypropylene films having-specifically defined characteristics eliminate the above mentioned drawbacks and satisfy the necessary other properties, and have completed the present invention.

Accordingly, the subject matter of the present invention is to provide package materials for the use of wrapping unit cases in bundle, which comprise;

(a) a biaxially-stretched polypropylene film substrate which has a stretching magnification of 2 to 15 times, a thermal contraction both in the longitudinal and the transverse directions of 2–8% and a relative ratio of the coefficients of the thermal contraction in both directions of 40% or less, (b) polyvinylidene chloride resin coating applied to one or both surfaces of the film substrate, and (c) an antistatic agent incorporated in at least one of said layers constituting the package materials.

In particular, the present package materials are especially useful for packaging for photographic roll film (small) unit cases in lots.

DETAILED DESCRIPTION OF THE PREFERRED EMBODIMENTS

Figure 1:
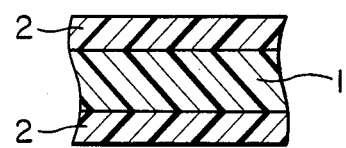
FIG. 1 is a partial sectional view, showing one embodiment of the basic constitution of the present package material, wherein (1) is biaxially-stretched polypropylene and (2) is polyvinylidene chloride.
Figure 2:
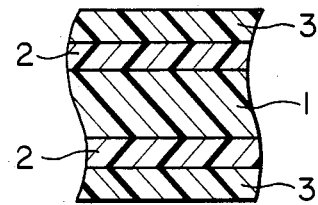
FIG. 2 shows another embodiment of the present package material wherein an acrylic copolymer layer (3) is formed on the polyvinylidene chloride (2), in order to reinforce the heat-sealing property of the film.

Appropriate stretching magnification of the present biaxially-stretched film is 2 to 15 times. This is because the elongation magnification within said range gives a set of appropriate strength, rigidity and thermal contraction.

The thickness is not specifically defined, and may be 10–30 microns, usually 15–25 microns, and preferably 18–22 microns.

In addition, it is necessary to specifically define the absolute thermal contraction and the relative ratio thereof in longitudinal/transverse directions, with respect to the biaxially-stretched film. The thermal contraction must be within the range of 2–8% both in longitudinal and transverse directions.

The "thermal contraction" given in the present description is one measured at 150° C.×15 minutes. The measurement thereof is made as follows: A regular square film of 250 mm×250 mm where lines are marked at 200 mm in both longitudinal and transverse directions, is heated in an oven at 120° C. for 15 minutes, and the length (l) of each of the marked segments of lines after heated is measured. The thermal contraction is then calculated as $(200-1)/200\times100$ (%). In case that the thermal contraction is less than 2%, tight wrapping is impossible because the package of wrapped unit cases becomes rickety. On the contrary, if this is more than 8%, wrinkles may occur. The preferred thermal contraction is 3–6%, and the range of 3.5–5.5% is most preferred for the wrapping operation.

In addition, the relative ratio of the thermal contraction in the longitudinal and transverse directions is another important factor, which must be 40% or less, in order to obtain uniformly completed package of good appearance in the mechanical packaging (wrapping) operation. The relative ratio in the present description is one calculated as $(A-B)/A\times100$ (%), where A is the greater value of the thermal contraction of longitudinal and transverse directions and B is the smaller one.

The relative ratio is preferably as smaller as possible. In practice, the range of 20% or less provides a sufficient stable use, that up to 30% a possible use under general conditions, and that of 40% or less a convenient use under certainly controlled conditions. On the other hand, however, in case that the relative ratio is more than 40%, the control of packaging process is difficult, resulting in occurrence of wrinkles and curls and the wrapping film is often caught by irregular winding up in a machine. The biaxially-stretched films having the specific relative ratio as defined above are not generally available, but it is possible to manufacture such films by using a conventional film-making machine where the stretching operation is performed under certainly controlled conditions.

Polyvinylidene chloride coating is applied to one or both surfaces of the thus biaxially-stretched polypropylene film. The coating is effective for improvement of the moisture-proofness, smoothness and gas-shielding ability of the film, and moreover effective for preventing the immigration of oily substances such as printing inks, papers, et al. into the biaxially-stretched film, and for preventing an occurrence of wrinkles resulting from swelling. These effects are noticeable in polyvinylidene chloride copolymer resins of a higher vinylidene chloride content. On the contrary, however, resins having a higher vinylidene chloride content are inferior in heat-seal property. Accordingly, in such cases where the heat-seal property is especially required, those of a relatively lower vinylidene chloride content may be used. In general, the vinylidene chloride content is no less than 60 mol %, preferably 75 mol % or more, and most preferably 88–94 mol %, the balance being acrylic ester copolymers, methacrylic ester copolymers, acrylonitrile copolymers, vinylchloride copolymers or the like. If the vinylidene chloride is less than 60 mol %, the following drawbacks result: crystallization of the coated film cannot occur, gas shielding property against oxygen or steam decreases, blocking occurs, slidability becomes poor, or the like. The polyvinylidene chloride resin may further include minor amounts of polyvinylidene chloride copolymers with acrylic acid, methacrylic acid, unsaturated monocarboxylic acid like crotonic acid, or unsaturated dicarboxylic acid.

The polyvinylidene chloride coating is formed, in general, to be 0.5–3 microns in thickness after dried, preferably 0.8–2 microns, most preferably 1.0–1.5 microns. The coating is in general formed by a conventional solution or emulsion coating process.

In the emulsion process, it is possible to increase the thickness by repeated coatings, which is however, restricted due to the crystallization of itself and is disadvantageous in view of the cost.

The solution (or solvent) process is free from said drawbacks, but the number of coating times and the thickness resulting therefrom are naturally restricted due to the necessity of complete drying. Coating by means of the combined solution and emulsion process is possible, and further, coating layers having different components or compositional ranges may optionally be formed on the surface of the film substrate or as an intermediate layer thereof. At any rate, it is necessary to form polyvinylidene chloride resin coating layer(s), containing 60 mol % or more vinylidene chloride monomer, on at least one surface of the biaxially-stretched polypropylene film substrate.

The package materials of the present invention contain an antistatic agent in at least one layer of polypropylene, polyvinylidene chloride and others. Conventional antistatic agents may be used in the present invention, and representative examples thereof are as follows: Anionic surfactants such as sodium alkyl sulfates, alkylaryl sulfonates, alkyl phosphates, etc.; cationic surfactants such as quaternary ammonium salts (e.g., distearyldimethylammonium chloride), imidazolines, etc.; ampholytic surfactants such as imidazoline/metal salt type, betaine type, etc.; and nonionic surfactants such as sorbitan type (e.g., polyoxyethylene-sorbitan-monoalkylates), ether type (e.g., polyoxyethylene-alkylphenyl ethers), ester type, acido type, etc.

The amount of antistatic agent to be used is not specifically defined, and in general, 0.1–1 wt % or so is incorporated. Incorporation of the antistatic agent facilitates the mechanical high-speed processing of (or mechanical packaging with) films.

Acrylic copolymer resin layer(s) may optionally be formed on one or both surfaces of the polyvinylidene chloride resin layer, in such case that the vinylidene chloride content in the resin is large, in order to improve the heat-sealing property and to further reinforce said property.

The package materials prepared as herein above mentioned are especially useful as package materials for packaging commercial unit cases of photo-sensitive materials, in lots. First of all, the thermal-contraction is appropriate about that the film does not so contract as to depress or crush the cases, and on the other hand, the film does not become so loose as to allow the package of unit cases packaged in one lot to become rickety. The thermal contraction may occur only by passing the film through a general mechanical packaging machine without using any specific shrinker, and therefore, there is no possibility that any undesired heating will be given to easily thermal-deteriorating goods. In addition, as the heat-sealing property is good, sealing of sufficient strength is possible within a broad range of 120°–180° C. without deterioration of the goods. Moreover, since the strength is appropriately reinforced as compared with non-stretched films, thinner films may be used. Therefore, the films of the present invention are advantageous in the viewpoints of cost, unsealability for opening, rigidity and transparency.

Still another advantage of the present films resides in that efficient operation in high-speed mechanical processing (packaging) is possible.

More precisely:

(a) The films are not caught in a machine since they have no wrinkles and curls.

(b) The rigidity is appropriate so as to allow mechanical processing with ease. Moreover, as the film is thin, fold-reforming is also easy.

(c) Sliding characteristic (smoothness) is good.

Regarding the sliding characteristic, the coefficient of static friction is within the range of 0.1–0.4 at 20° C., 65% RH. If necessary, it is easy to adjust said range, preferably within 0.20–0.35, more preferably, 0.25–0.30.

Thus, mechanical packaging in a higher speed has been made possible by using the present films with less occurrence of defects, and costs for checking and re-packaging may be reduced. Moreover, the present films are more economical than cellophane type or polyethylene type films in view of their costs.

The present package materials may optionally contain other additives such as anti-blocking agents, lubricants, plasticizers, etc. Regarding the polypropylenes, crystalline isotactic polypropylenes are preferred, and a part (i.e., no more than 50 wt %) of polypropylene may optionally be substituted by other components. For example, copolymers containing α-olefins having 2–10 carbons of not exceeding 50 wt % (preferably 46–5 wt %, most preferably 45–10 wt %) are expected to have analogous effects. Such α-olefins encompass ethylene, 1-butene, 1-octene, 1-hexene, or 4-methylpentene-1 or a mixture thereof. If α-olefins exceed 50 wt %, the following drawbacks occur: (1) Toughness decreases, (2) slidability is reduced, (3) tensile strength decreases, (4) contraction start temperature increases, and (5) coefficient of thermal contraction decreases. Blended mixtures of polypropylene with other polymers of not exceeding 30 wt % (preferably 25–5 wt %, most preferably 20–10 wt %) may also be used. If the blending polymers exceed 30 wt %, similar drawbacks as hereinabove mentioned arise. Such other polymers for blending includes polyethylene, ethylene-vinyl acetate copolymer (EVA), ethylene-ethyl acrylate copolymer (EEA), ethylene-methyl acrylate (EMA) or the like or a mixture thereof.

In the following, the preferred embodiments will be disclosed by specific Examples which are presented for illustrative purposes and not for limitative purpose. Modifications apparent in the art will be made without departing from the concept of the present disclosure.

EXAMPLES

Two kinds of package materials of the present invention and two kinds of conventional package materials (as comparison) were investigated as follows:

The present package material (A) used herein comprises a substrate of biaxially-stretched polypropylene film (polypropylene content: 100%) wherein the stretching magnification is 8 times, the thermal contraction is longitudinally 4.0% and transversally 4.8% (120° C., 15 minutes) and the thickness is 20 microns; and a polyvinylidene chloride resin (vinylidene chloride monomer 90 mol %, the balance) was coated on both surfaces of the film to form 1 micron-thick coatings, by a solvent-coating process. As an antistatic agent, 0.5% of commercial surfactant, Leostatt 53 (RTM by Lion Fat & Oil Co., Ltd., which is imidazoline/metal salt type ampholytic surfactant) was blended into the polypropylene layer.

Another present package material (E) comprises a substrate of biaxially-stretched polypropylene film wherein the thermal contraction is longitudinally 3.3% and transversally 4.3%, the thickness is 19 microns and the other characteristics are same as the material(A); and 1 micron-thick polyvinylidene chloride resin coatings were formed on both surfaces thereof by the solvent-coating process; and 1 micron-thick acrylic copolymer film was additionally coated on one surface thereof.

A conventional package meterial (C) comprises a substrate of a 22 micron-thick moisture-proof sheet of cellophane, wherein 1.5 micron-thick poly-vinylidene chloride coatings were formed on both surfaces thereof by the solvent-coating process.

The other conventional package material (D) is a non-stretched low density polyethylene film having a thickness of 39 microns.

Table 1 shows the physical properties of each package material. The two materials of the present invention were proved to be superior to the conventional materials, as the result of a high-speed wrapping test.

Coefficient of static friction has been obtained by an inclination angle method as follows: A piece of a sample sheet is cut out and adhered onto a bottom surface of a block with a constant weight (75 mm×35 mm, 200 g). Another piece of the sample sheet is adhered onto a slope and said block is with its bottom surface placed on the slope. Then one end of the slope is lifted by a constant lifting speed of 15 mm/sec. The angle at which the block starts to slide is measured.

TABLE 1

|  | Present film A | Present film B (with acrylic coating) | Conventional film C (moisture-proof cellophane) | Conventional film D (non-stretched polyethylene) | Measurement |
| --- | --- | --- | --- | --- | --- |
| Thickness ($\mu$) | 22 | 22 | 25 | 39 | According to JISP 8118 |
| Tensile Strength longitudinal (kg/15 mm) | 5.0 | 4.3 | 3.5 | 1.3 | According to JISP 8113 |
| Tensile Strength transverse ($\mu$) | 7.4 | 6.5 | 1.7 | 0.7 | According to JISP 8113 |
| Extent of Impact-perforation | good | excellent | no good | excellent | According to JISP 8134 |
| Thermal contraction longitudinal (%) | 4.0 | 3.3 | 3.0 | 0.5 | Contraction % at 120° C. × 15 minutes |
| Thermal contraction transverse (%) | 4.8 | 4.3 | 1.5 | 0 |  |

TABLE 1-continued

|  | Present film A | Present film B (with acrylic coating) | Conventional film C (moisture-proof cellophane) | Conventional film D (non-stretched polyethylene) | Measurement |
|---|---|---|---|---|---|
| Coefficient of static friction longitudinal | 0.27 | 0.2 | 0.3 | 0.4 | Inclination angle method; speed 15 |
| Coefficient of static friction transverse | 0.27 | 0.2 | 0.3 | 0.5 | Inclination angle method; speed 15 |
| Packaged state | good | good | somewhat no good | no good |  |
| Packaging applicability to high-speed machine | good | good | somewhat no good | no good |  |

What is claimed is:

1. A package material for wrapping unit cases in a bundle which comprises:
   (a) a biaxially-stretched polypropylene film substrate having a stretching magnification of 2-15 times, coefficients of the thermal contraction both in the longitudinal and transverse directions of 2-8%, and a relative ratio of the coefficients of the thermal contraction in the longitudinal and transverse directions of 40% or less;
   (b) polyvinylidene chloride resin coating applied onto at least one surface of the polypropylene film substrate; and
   (c) an antistatic agent incorporated in at least one of the layers constituting the package material.

2. The package material as defined in claim 1, wherein the polypropylene film substrate is a crystalline isotactic polypropylene.

3. The package material as defined in claim 1, wherein the polypropylene film substrate is a polypropylene copolymer with α-olefins having 2-10 carbon atoms, the content of α-olefins not exceeding 50 wt %.

4. The package material as defined in claim 1, wherein the polypropylene film substrate contains not more than 30 wt % of an ethylene polymer blended with the polypropylene.

5. The package material as defined in claim 4, wherein said ethylene polymer is polyethylene.

6. The package material as defined in claim 1, wherein the polyvinylidene chloride resin coating contains 60 mol % or more of vinylidene chloride.

7. The package material as defined in claim 1, wherein the polyvinylidene chloride resin coating includes a monolayer coating or a multilayer coating.

8. The package material as defined in claim 7, wherein said polyvinylidene chloride resin coating includes a multilayer coating comprised of a polyvinylidene copolymer with an unsaturated monocarboxylic acid or an unsaturated dicarboxylic acid.

9. The package material as defined in claim 1, wherein the antistatic agent is present in an amount of approximately 0.1-1 wt %.

10. The package material as defined in claim 1, wherein the film substrate is approximately 10-30 microns thick.

11. The package material as defined in claim 1, wherein the polyvinylidene chloride resin coating is approximately 0.5-3 microns thick.

12. The package material is defined in claim 1, wherein at least one acrylic copolymer resin layer is further formed on at least one surface of the polyvinylidene chloride resin coating.

13. The package material as defined in claim 1, wherein at least one of the outer layers constituting the package material contains at least one additive selected from the group consisting of anti-blocking agents, lubricants and plasticizers.

14. The package material as defined in claim 1, wherein the coefficient of the thermal contraction is 3-6%.

15. The package material as defined in claim 1, wherein the relative ratio of the coefficients of the contraction in both directions is 20% or less.

16. The package material as defined in claim 3, wherein the α-olefins includes one or more selected from the group consisting of ethylene, 1-butene, 1-octene, 1-hexene, and 4-methylpentene-1.

17. The package material as defined in claim 4, wherein the ethylene polymer includes one or more selected from the copolymers of ethylene with vinyl acetate (EVA), ethyl acrylate (EEA) and methyl acrylate (EMA).

18. The package materials as defined in claim 6, wherein the balance of polyvinylidene chloride resin coating includes one or more of polyvinylidene copolymers with acrylic ester, methacrylic ester, acrylonitrile, and vinyl chloride.

* * * * *